United States Patent
Guidetti

(10) Patent No.: US 6,766,628 B2
(45) Date of Patent: Jul. 27, 2004

(54) METHOD AND DEVICE FOR FORMING GROUPS OF ARTICLES IN CONVEYOR SYSTEMS FOR AUTOMATIC PACKAGING INSTALLATIONS

(75) Inventor: Dario Guidetti, Grignasco (IT)

(73) Assignee: Cavanna SpA (IT)

(*) Notice: Subject to any disclaimer, the term of this patent is extended or adjusted under 35 U.S.C. 154(b) by 64 days.

(21) Appl. No.: 09/750,514

(22) Filed: Dec. 28, 2000

(65) Prior Publication Data

US 2001/0020355 A1 Sep. 13, 2001

(30) Foreign Application Priority Data

Mar. 13, 2000 (EP) .............................................. 00830186

(51) Int. Cl.[7] .............................................. B65B 35/30
(52) U.S. Cl. ........................ 53/443; 53/147; 198/419.2
(58) Field of Search .......................... 53/531, 147, 443, 53/446, 542, 447, 540; 198/418.7, 419.1, 419.2

(56) References Cited

U.S. PATENT DOCUMENTS

| 4,296,590 A | * | 10/1981 | Focke ........................ 53/531 |
| 4,360,098 A | * | 11/1982 | Nordstrom ................ 198/418.1 |
| 4,610,346 A | * | 9/1986 | Phillipson ................ 198/419.1 |
| 4,921,088 A | * | 5/1990 | Ter Horst ................ 198/418.7 |
| 5,147,027 A | * | 9/1992 | Cruver ..................... 198/419.3 |
| 6,164,436 A | * | 12/2000 | Taylor ..................... 198/419.2 |

FOREIGN PATENT DOCUMENTS

| EP | 0 708 028 A1 | 4/1996 |
| GB | 2 090 804 A | 7/1982 |
| NL | 6 902 462 | 8/1970 |
| WO | WO 99/03766 | 1/1999 |

* cited by examiner

Primary Examiner—Rinaldi I. Rada
Assistant Examiner—John Paradiso
(74) Attorney, Agent, or Firm—Dorsey & Whitney LLP

(57) ABSTRACT

Groups comprising a specified number of articles separated by intervals of separation are formed from an incoming flow of articles. The process involves interacting with the flow of articles in such a way as to bring about, in a coordinated manner:

Figure 1:
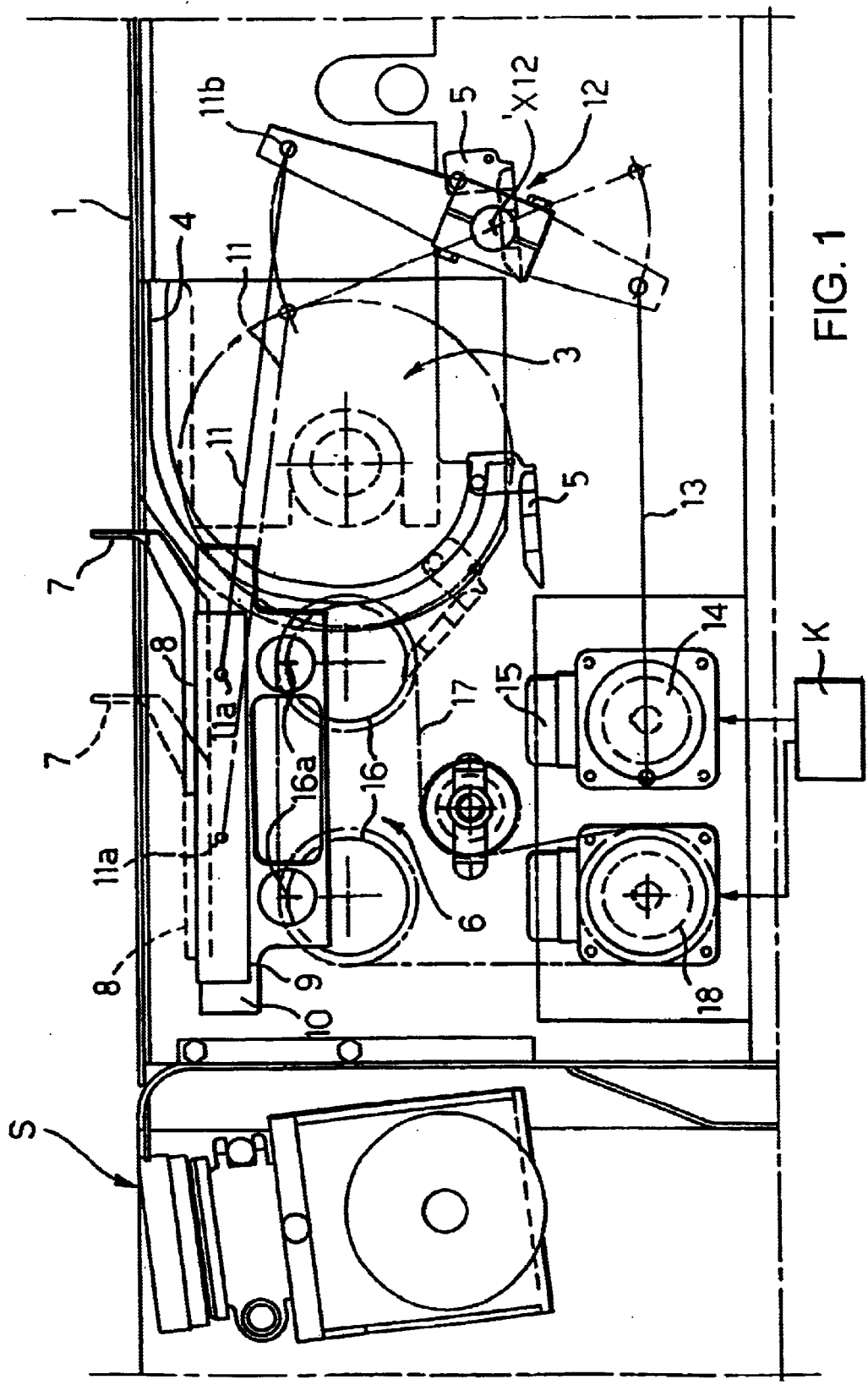

- a slowing action on at least one article situated in the forwardmost position of its particular group, and
- an accelerating action on at least one article situated in the rearmost position of its particular group.

11 Claims, 5 Drawing Sheets

METHOD AND DEVICE FOR FORMING GROUPS OF ARTICLES IN CONVEYOR SYSTEMS FOR AUTOMATIC PACKAGING INSTALLATIONS

The present invention relates to methods of forming groups of articles, e.g. in the case of machines for automatically packaging products such as food products, especially of the type designed to produce multiple packs or "multipacks" as they are known.

This possible application, to which extensive reference will be made in the course of this description, should not however be interpreted as tending to limit the scope of the invention.

In a machine for producing multipacks, the individual articles in the pack (each consisting of an individual product or group of products, such as one or more bars of chocolate already inserted in a pack of the type commonly known as "flow-pack") are grouped together and then inserted into another "flow-pack" pack of larger size. The articles intended to be grouped together are usually fed to the inlet of the machine that forms the multiple packs in the form of a continuous flow of groups of articles running more or less nose-to-tail (even though not necessarily with contact and/or appreciable pushing). In order to produce the multiple pack it is therefore necessary to create, between the groups of articles moving in this continuous flow, regularly spaced gaps or spaces in which the continuous tubular wrapping from which the multipack is to be made can be subjected to the action of the sealing and cutting elements (the so-called "jaws") that produce the closed ends of the individual multipacks.

The approaches traditionally adopted in this field to solve this problem can be broken down into two fundamental versions, namely:

- those in which, by different means, empty spaces corresponding to the absence of an article are created in the incoming flow, and
- those in which the stream of articles introduced into the tubular wrapping to make the multipack is modified by periodically slowing down one article in n. The number n of course indicates the number of articles included in the group that is to be fed into a single multipack.

The first approach is often found to be rather critical to realize in terms of machinery, chiefly because it is fairly rigid in terms of how it operates. This applies particularly to the possibility of selectively varying (i) the size of the spaces created in the incoming flow, and (ii) the number n of articles included in each group. When this approach is adopted in combination with conveying systems that apply a positive drive to the products (e.g. toothed-chain conveyors in which a tooth or lug drives each conveyed article), the modifications referred to above almost invariably involve replacing parts of the conveyor system—a factor which is usually most unwelcome to users who wish to be able to vary the modes of operation of the machine (or format change) without having to change parts.

The implementation of the second approach (with slowing down or, more usually, momentarily stopping the flow of incoming articles at selectively determined positions) becomes difficult as the speed of advance of the incoming articles increases. At high speeds the periodic action of slowing or stopping tends to induce bumping, bouncing and misalignment of the articles with consequent loss of the exact positioning required at the moment of insertion into the tubular wrapping defining the multipack.

Document U.S. Pat. No. 6,006,892, used as the model for the preambles of claims 1 and 4, describes yet another approach, in which the groups of articles are formed by a pusher element capable of selectively applying to the articles themselves a pushing action generated by a movement at a speed generally greater than the speed of advance of the articles in the incoming flow. The groups are therefore formed by one article moving towards at least one article situated ahead of it in the said flow.

In particular, the same document describes a mechanism for operating the pusher element that essentially comprises a supporting arm fitted with a first operating arm and a second operating arm, the arrangement being such that the pusher element is given a cyclical movement along a roughly ellipsoidal path.

Though operating perfectly satisfactorily, the approach described in the abovementioned document is capable of further improvement from at least two points of view, namely:

- the ability to operate over a wide range of possible values for the number n of articles included in each group, and
- the ability to carry out the format-change function completely automatically (in practice, simply by acting on the electronic control unit of the mechanism) without the need for modifying or replacing parts of the mechanism.

It is an object of the present invention to provide a solution capable of realizing the abovementioned improvements.

According to the present invention, the possible field of application of which is not however limited to the particular sector referred to above, this object is achieved by means of a process having the further characteristics claimed specifically in the appended claims.

The invention also refers to a corresponding device.

While on the subject, it should be noted that the device according to the invention is equally suitable both for carrying out the process described above and for performing processes involving forming groups of more conventional type, e.g. on the principles described in document U.S. Pat. No. 6,006,892 already referred to earlier and in the prior art cited in that document.

The invention will now be described, purely by way of a non-restrictive example, with reference to the accompanying drawings, in which:

FIG. 1 is a general side view of a device capable of operating according to the invention, and FIGS. 2 to 5 are further views, substantially corresponding to FIG. 1, which illustrate the device according to the invention in different possible positions of operation.

The figures illustrate part of a packing machine of the type often used for making so-called "multipacks". The general characteristics of these machines are well known in the sector; in view of this fact, the overall structure and characteristics of the machine illustrated will be reviewed in outline only in so far as they are useful for the purposes of understanding the invention.

Briefly, then, FIG. 1 is a section through an automatic packing machine, e.g. for confectionery products, that is situated immediately upstream of a packing machine intended to produce multipacks.

To avoid misunderstandings, with reference to the point of observation of the figures in the accompanying drawings, the multipack packing machine is situated on the left, and the direction of advance of the articles P is from right to left.

The packing machine operates on a sheet material such as plastic laminate, aluminium, paper, etc. The sheet material is taken from a supply source and fed into a shaping device to form a tubular preform. This preform is securely closed into a tube along a longitudinal sealing line that is usually produced by a number of sealing units comprising pairs of opposing sealing wheels situated underneath the general plane of advance (marked 1) on which the articles P are travelling. On the left of FIG. 1 the first of the abovementioned sealing units of the packing machine (which is not illustrated in its entirety) is clearly visible.

In the illustrative application considered here, which is illustrative only, the term "multipack" indicates the fact that each of the articles P itself consists of one product or a number of products (e.g. one or more bars of chocolate) that have already been inserted into their own individual "flow-pack" type packs prepared in a packing station situated upstream (and not illustrated in the drawings).

Clearly, however, the solution according to the invention is suitable in general for producing groups of articles P whatever their nature. In other words it is perfectly possible for them to be "bare" articles that have not already been inserted into their own individual packs.

In order for the packing machine to be able to carry out its function of creating packs each containing a given number n of articles P (n is equal to 5 in the illustrative embodiment illustrated), spaces W must be formed to separate groups G of successive articles in the continuous flow of articles P presented to the inlet of the machine 1 (moving from right to left when viewing the figures). The spaces W must be formed in precisely predetermined positions and their length must be such as to allow insertion of the jaws of the packing machine, followed by compression, sealing and cutting of the tubular wrapping, during which process, no article P must be subjected to any accidental or unintended action of compression.

Thus, as can be seen more clearly on the right-hand side of FIGS. 2 to 5, the articles P are fed in in an even flow with a certain separating distance between successive articles. The arrangement is such that the spaces W can be formed by a gradual movement of closing up of the articles P.

The even spacing of the articles P as they enter the machine can be brought about by a conveyor 3, which may for example be constructed in the form of a conveyor comprising a chain 4 driven by a motor (not shown) and with individual drive elements (so-called lugs, marked 5). In this way it is possible to ensure that the articles P are always treated individually until the moment at which they are wrapped in the wrapper material, thereby reducing the risk of uncontrolled events caused by one article pushing on preceding articles.

The methods of controlling the loading of the articles onto the conveyor 3 are prior art and there is no need to describe them here.

An important characteristic of the solution according to the invention is that the closing up of the articles P, and the consequent formation of the groups G and simultaneous formation of the spaces W, is brought about by a combined action as follows:

on the one hand, a slowing down, and preferably a stopping, of the flow of articles P, and on the other hand, an acceleration (or pushing forwards) exerted on the said articles P.

The articles P destined to be included in each group G are therefore closed up towards each other partly by the slowing down or stopping of the article P situated furthest downstream or forward-most in the group (to avoid misunderstanding, in the leftmost position when viewing the figures), and partly by a positive pushing action or acceleration exerted by acting on the articles situated in the position furthest upstream (or rearmost position) in the general direction of advance, i.e. in the rightmost position in the figures.

To be more precise, the groups G are formed as a result of two successive actions of bunching up, respectively corresponding to:

the bunching up/closing up, to the article situated the furthest downstream in the direction of advance, of the article or articles immediately upstream; this first bunching up being brought about by the slowing down or stopping of the article situated downstream or forwardmost in the group, and the subsequent acceleration or push exerted, in a downstream direction, on the other articles of the group, with the result that these latter articles are caused to bunch up/close up with each other and bunch up/close up also towards the other articles situated further ahead (i.e. further downstream) that have already been bunched up/closed up with each other.

All other parameters or conditions of operation being equal, the solution described here makes it possible to produce a wide range of possible variation of the number n of articles P included in each group G.

Even if this requirement is not essential, in the currently preferred embodiment of the invention the abovementioned actions of slowing down/stopping (on the one hand) and accelerating/pushing (on the other) are carried out by a single motorized unit 6 situated below the plane of advance 2. The active element of the unit 6 employed to act on the articles P is an element 7 that consists, in the currently preferred embodiment of the invention, of a sort of tooth or lug of preferably forked structure and constituting in reality the distal part of a moving member indicated by the general reference 8.

The moving member 8 is mounted on (or itself constitutes) a sort of carriage capable of executing, for example by means of the presence of revolving bodies such as wheels or rollers not actually visible in the drawings, a back and forth movement along one or more tracks 9 mounted on another moving member 10. The tracks 9 extend in the general direction of advance of the articles P within the area occupied by the plant described here (that is to say, with reference to the point of observation of the drawings, in an essentially horizontal direction).

The abovementioned horizontal movement of the moving member 8 (and hence of the element 7) occurs under the action of a control arm or rod 11 (here shown in purely geometrical terms) that has a first end 11a connected to the moving member 8 and a second end 11b hinged to a corresponding distal end of a pivoting rocker 12 capable of executing a back and forth pivoting movement about a horizontal axis X12 that lies transversely with respect to the direction of advance of the articles P within the area of the machine illustrated.

The abovementioned movement of angular pivoting about the axis X12 is controlled by another control lever or rod 13 (also shown purely geometrically) which in practice forms the connecting rod element of a connecting rod and crank unit 14 driven by a motor 15 (FIG. 1).

It will be obvious however, that the result described (that is to say, the ability to give the active element 7 a general reciprocating motion in a horizontal direction, on the principles described more fully below) can be obtained with means kinematically equivalent to those described above. These means correspond to an embodiment of the invention that is at present considered preferable, but is certainly not essential for the purposes of carrying out this invention.

In the example of an embodiment illustrated here, the tracks 9 are two in number and both are channel-shaped, opening towards each other, so as to accommodate in their interior in a moving relationship the revolving bodies of the carriage 8. The moving member 10 carrying the tracks 9 is in turn mounted on a set of wheels or rollers 16 in an arrangement somewhat like the wheel system of a steam locomotive. To be specific, in the illustrative embodiment shown here (which, it will be remembered, is illustrative only), the moving member 10 extends horizontally with its ends hinged at homologous points 16*a* (that is to say, always located instantaneously in the same angular position with respect to orbital paths of equal radius) on the wheels 16, which are rotated at the same speed by, for example, a timing belt drive 17 powered by motor 18.

The overall result is that, owing to the rotation of the wheels 16 on which they are mounted, the moving member (and therefore the tracks 9 along which the carriage 8 supporting the active element 7 moves) rise and fall relative to the machine frame and thus move towards and away from the surface 1 along which the articles P are travelling. This takes place with an upward and downward movement whose amplitude is identified by the diameter of the paths around which orbit the points 16*a* where the moving member 10 is hinged to the wheels 16.

Once again, it will be clear that the same result, i.e. that of being able to select the upward and downward movement of the active element 7, can be achieved with different but functionally equivalent means to those described. Once again, the solution described corresponds to a currently preferred, but not obligatory, embodiment of the invention.

Because the carriage 8 carrying the active element 7 is free to move backwards and forwards on the tracks 9 mounted on the moving member 10, the backward and forward movement of the active element 7 instigated by the motor 15 is completely independent of the upward and downward movement of the same element 7 instigated by the motor 18.

The above motors 15 and 18 (typically two electric motors) therefore constitute two independent drives capable of being operated similarly independently via the control unit K (typically a so-called PLC or Programmable Logic Controller, or an equivalent device) that supervises the operation of the machine as a whole.

In particular, in the above account the following advantages will have been observed:

- the motor 15 can be operated selectively in any angular position of operation, with any desired phase and speed of operation (and therefore with the facility of moving the element 7 at any desired moment to any position in its stroke along the path of advance of the articles P) independently of the angular position at that moment of the motor 18, and therefore independently of the height of the moving member 10 (supported on the wheels 16) which, through the tracks 9 and the carriage 8, is carrying the active element 7, and
- the motor 18 can be moved at any moment to any angular position, with any desired phase and speed of operation so as to move the element 7 to any position in its upward and downward stroke relative to the path of advance of the articles P, independently of the position of operation of the motor 15, and therefore of the position of the active element 7 in its possible back and forth stroke relative to the path of advance of the articles P.

The mechanism controlling the horizontal back and forth movement (the mechanism represented here by elements 11 to 15) is designed in such a way that the length of the forward stroke—and, symmetrically, the backward stroke—of the element 7 is such as to be appropriate for the length of the travel surface 1 identified by the number n of articles which it is wished to collect into a single group G and by the spaces originally provided between them. By controlling the motors 15 and 18 in a manner known per se through the unit K, it is therefore possible to arrange for the active element 7 to alternately emerge above the travel surface 1 (where it can interfere with the flow of articles P) or disappear below this travel surface (and so disengage from the articles P) in any position selected at will—in space and in time—with reference to the advancing movement of the articles P on the surface 1.

In particular, these modes of operation allow the operation of forming the groups of articles P to be carried out in accordance with the principles illustrated in greater detail in FIGS. 2 to 5.

These principles correspond to the general principle already referred to in the introductory part of this description, namely the carrying out of two combined operations of closing the articles up towards each other, these operations being achieved by the slowing/stopping and accelerating/pushing, respectively, of the articles P, downstream and upstream, respectively, of the group G that is being formed.

Figure 2:
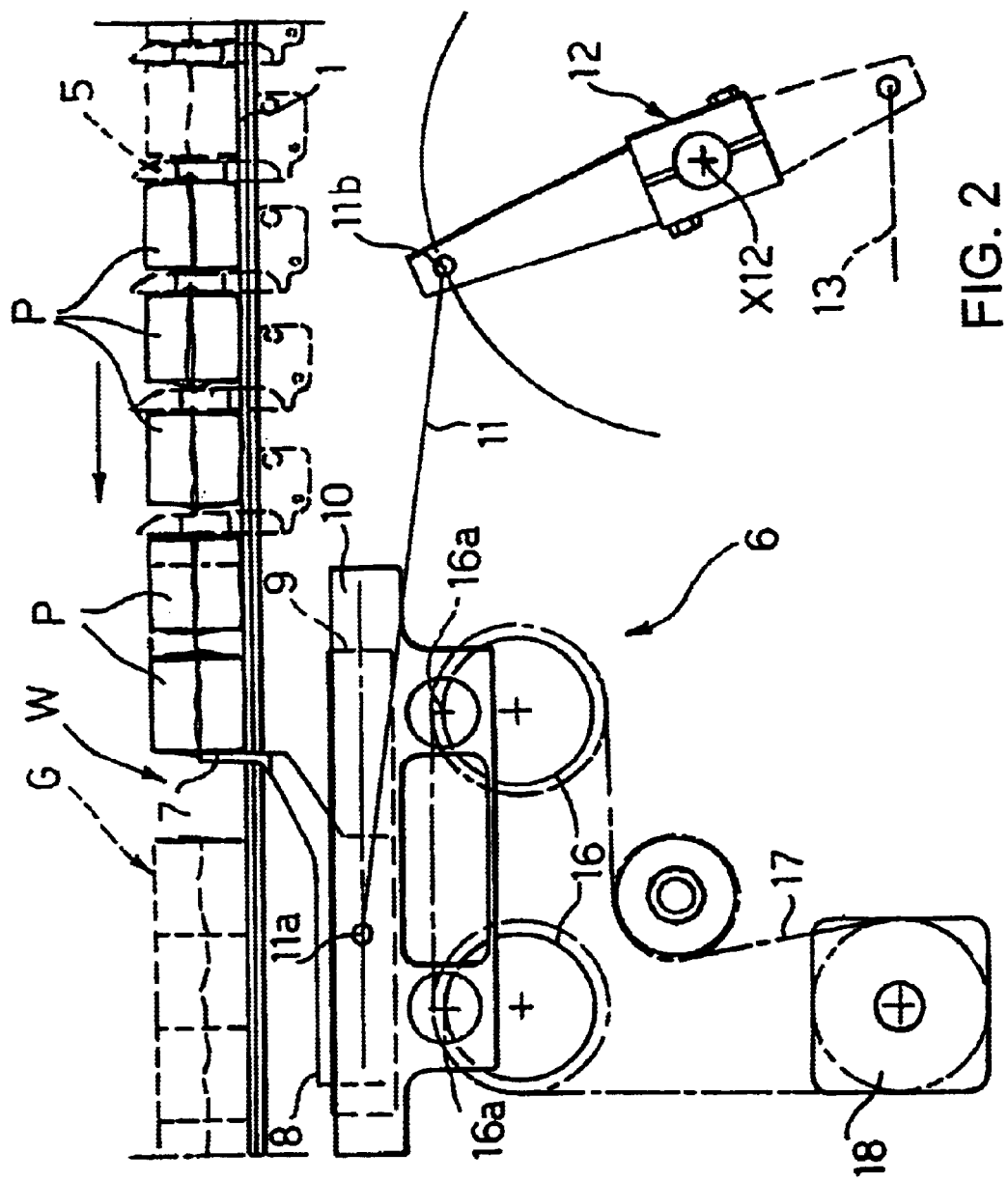

In particular, FIG. 2 shows that, as it emerges above the travel surface 1 as an effect of the lifting movement transmitted by the wheels 16 to the moving member 10, the active element 7 can position itself in front of the first article P of a group and stop it or slow it down: this result can be obtained by correspondingly regulating the speed of rotation of the motor 15 relative to the speed of advance transmitted to the articles P by the conveyor 3. This slowing down or stopping action (which can be adjusted by varying the speed of rotation of the motor 15 in such a way as to vary the speed of movement of the element 7, if necessary stopping it and reversing its direction of movement) produces, as stated earlier, a bunching up/closing up of the first two or first three articles destined to be included in each group.

This result having being obtained, the motor 18 can be adjusted to cause the element 7 to "disappear" underneath the travel surface 1 so that the articles P, already partly closed up on each other, can continue their advancing movement along the surface 1 under the action of the conveyor 3.

Figure 3:
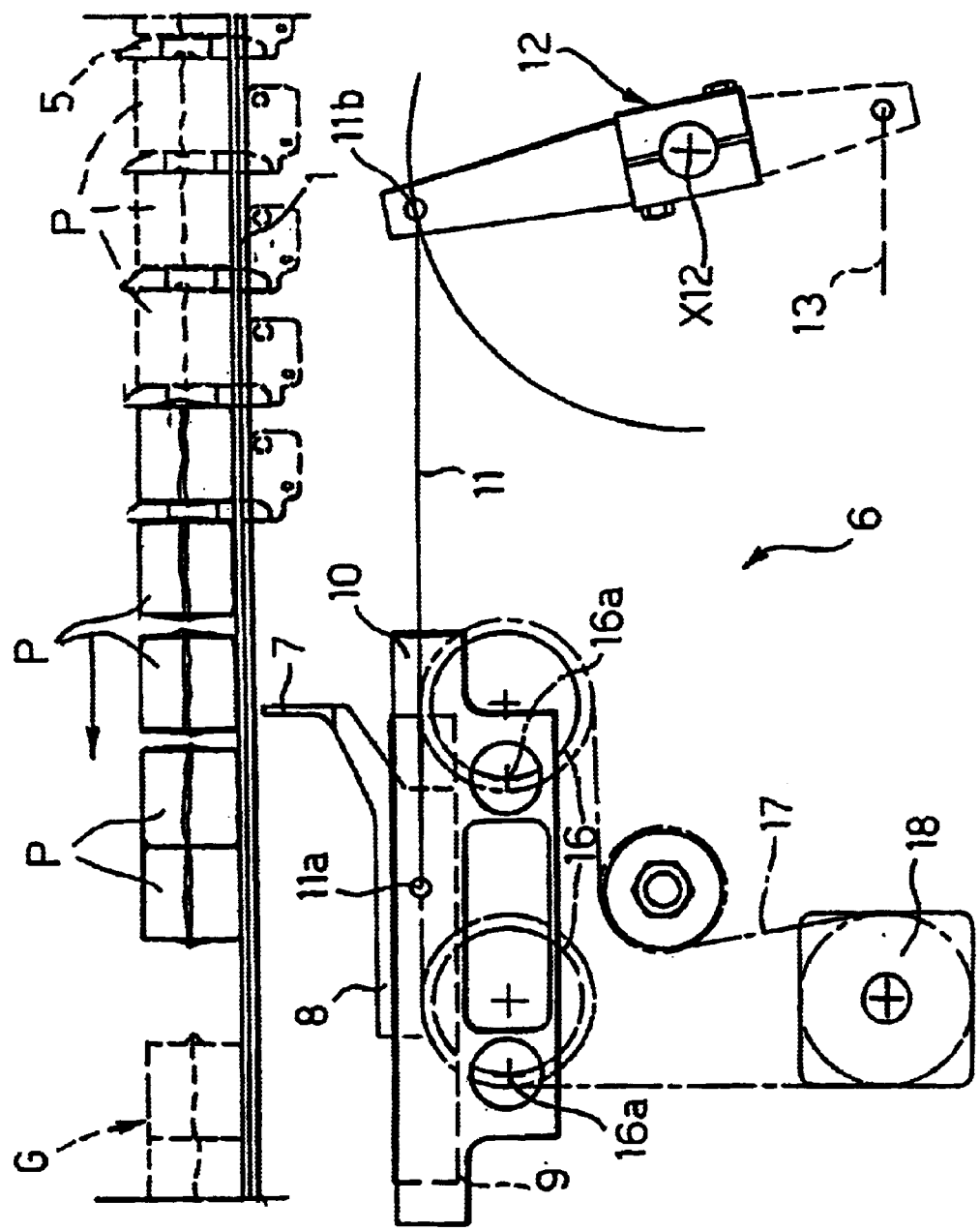
Figure 4:
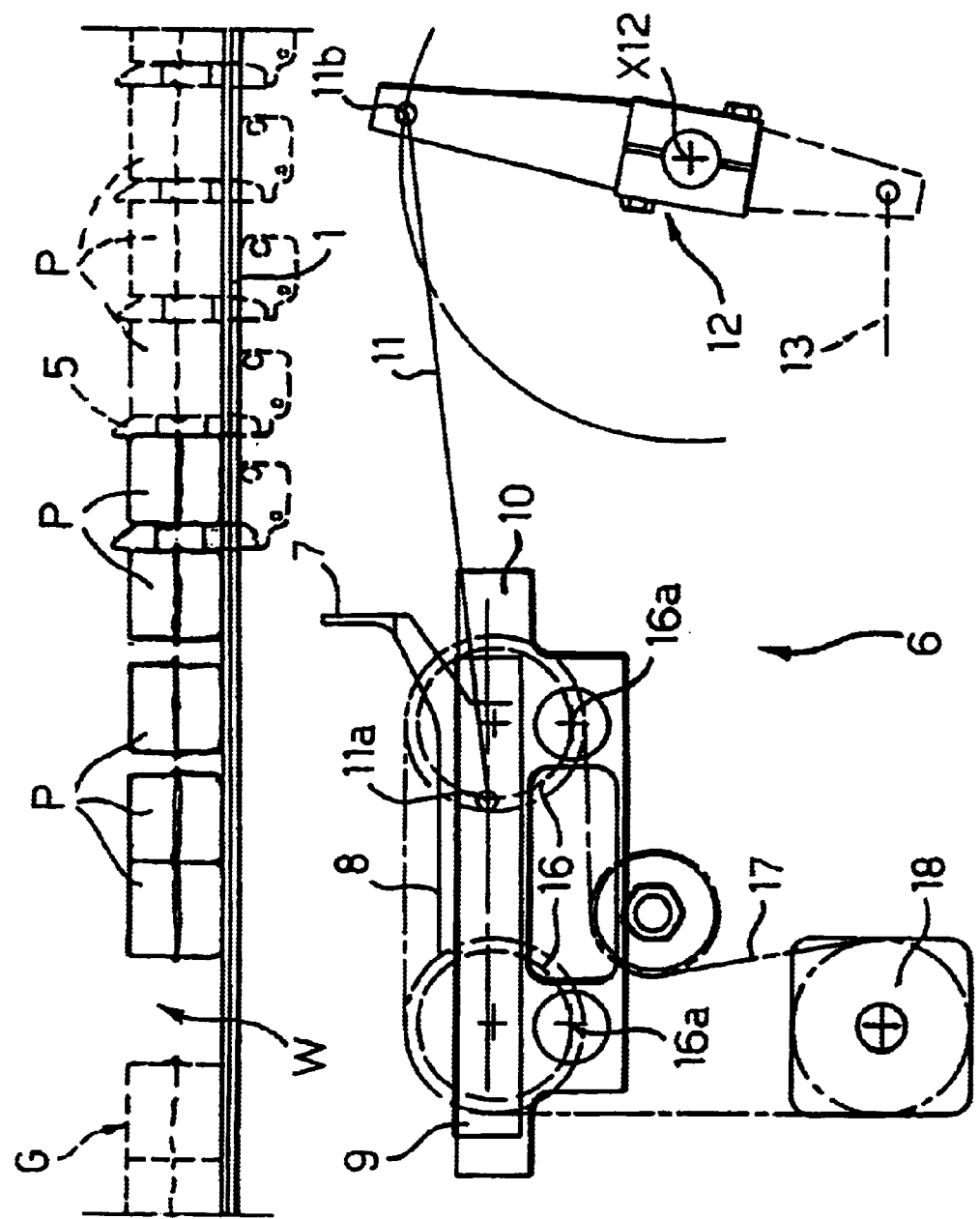

In coordination with the operation of the motor 18 that produces the abovementioned downward movement, the motor 15 is controlled to move the carriage 8 back, as schematically illustrated in FIGS. 3 and 4.

Figure 5:
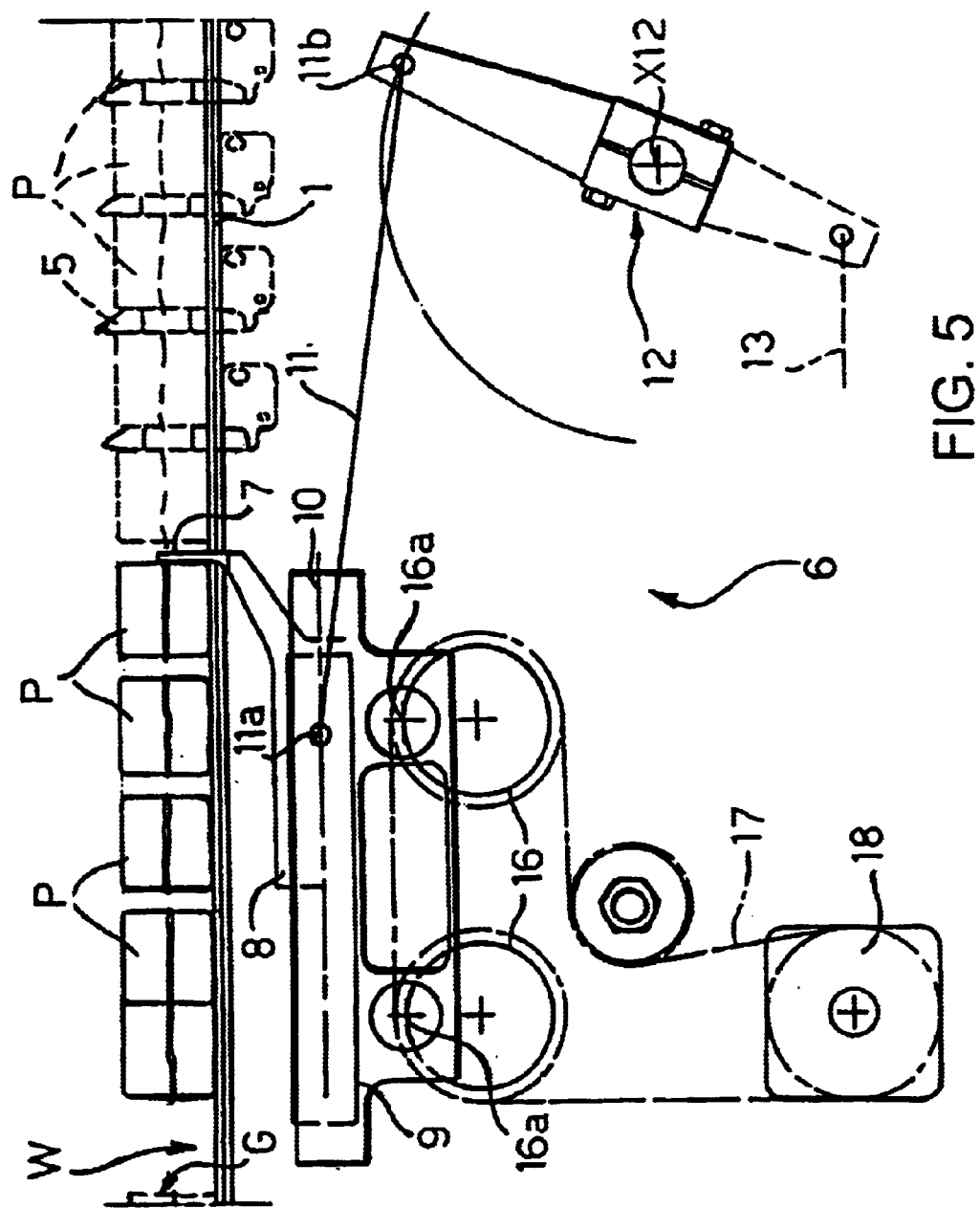

All of this is done in such a way as to allow the element 7 to emerge once again above the surface 1 (due to a corresponding action of the motor 18) and insert itself behind the articles P destined to be included in a group G (FIG. 5).

The purpose of this is to be able to push the abovementioned articles forward, by a corresponding movement of the motor 15, in such a way as to give rise to the formation of a bunched up or closed up group of articles G. This produces a space W separating the group from the immediately succeeding articles P in the flow moving towards the mechanism according to the invention.

At this point the movement of the element 7 can be slowed down or stopped so as to return to the operating condition shown in FIG. 2, where the newly-formed group G of articles P can be seen on the left in broken lines and separated by a space W from the next group which is just beginning to be formed.

The cyclical repetition of the sequence of operations illustrated in FIGS. 2 to 5 corresponds to the continuing formation of groups of articles P described previously.

The conditions of operation illustrated in FIGS. 3 to 5 can be thought of as corresponding to imaginary stills in a film sequence representative of the movement of the element 7 and of the elements connected to it, in the sense that, although including periods of movement at different velocities, the movement of the element 7 usually includes no actual stoppages, even though this possibility cannot be ruled out, at least in certain operating conditions.

It will also be observed that by adjusting the motors 15 and 18 it is possible to selectively vary, in a wide range of possible values, the positions in time and space at which the various conditions represented in the appended drawings occur. This corresponds to the ability to select with great freedom the number n of articles P included in each group G, or, in general, the total length of each group G defined by a combination of the number n and the length of the individual articles P. It is because of this fact that the "format-changing" operation is able to be carried out simply by varying the criteria of operation of the motors 15 and 18, without in any way modifying or removing parts of the mechanism illustrated.

Should this be necessary or advantageous for the particular conditions of operation (where for example there are groups G containing a small number of articles P, e.g. only two or three articles), the mechanism can easily be converted from the modes of operation described above (in which the groups G are produced by a slowing or stopping action at the front and an acceleration or pushing from behind the group G) to more conventional principles of operation, such as a single slowing/stopping action or a single accelerating/pushing operation.

Needless to say, without affecting the principle of the invention, the details of construction and the embodiments can be varied considerably compared with those described and illustrated, without thereby departing from the scope of the invention as defined in the appended claims.

What is claimed is:

1. A process for forming, from an incoming flow of articles, groups comprising a specified number of articles, the said groups being separated by intervals of separation, the process comprising the following operations:

imparting a given speed of advance to the said incoming flow of articles, slowing down the advance of at least a first article destined to be in the forwardmost position of its particular group by exerting via a first element a force on a portion of the at least first article not in contact with a second element imparting the given speed of advance, and accelerating the advance of at least one other article destined to be in the rearmost position of its particular group by exerting via the first element a force on a portion of the at least one other article not in contact with the second element imparting the given speed of advance.

2. The process according to claim 1, wherein there is interaction with the said articles by a single active element adapted for exerting both the said slowing action and the said accelerating action on the articles.

3. The process according to claim 2, including the operations of providing a travel surface for the said articles and of moving the said active element relative to the said travel surface selectively in such a way that it:

extends from the said travel surface such that it can interact with the said articles, and retracts from the said travel surface such that it does not interfere with the advance of the said articles at the said given speed of advance.

4. The process of claim 2, wherein the active element has an overall forked configuration.

5. The process of claim 1, wherein:

the operation of interacting with the flow of articles to form the groups by selectively modifying the speed of advance of at least some of the articles is performed by an active element; and further comprising the operation of imparting to the active element a two-way movement in the path of advance of the articles.

6. The process of claim 5, wherein:

the operation of imparting to the active element a two-way movement in the path of advance of the articles is carried out by a first operating device comprising:

a carriage carrying the active element;

at least one track to allow movement of the carriage in the direction of the path of advance of the articles; and a motor unit for moving the carriage along the at least one track.

7. The process of claim 6, further comprising the operation of imparting to the active element a movement towards and away from the path of advance of the articles between at least one active position of interaction with the articles and a retracted position of disengagement from the articles.

8. The process of claim 7, wherein the operation of imparting to the active element a movement towards and away from the path of advance of the articles is carried out by a second operating device comprising:

at least one support for the active element; and a mover element for imparting to the at least one support a selective movement towards or away from the path of advance of the articles.

9. The process of claim 7, wherein the second operating device further comprises at least one element capable of acting, at least in part, as both a track and a support for the active element.

10. The process of claim 7, wherein the at least one support comprises two ends associated with homologous points of two revolving bodies so that the at least one support maintains a constant orientation in space during a rotary movement of the two revolving bodies.

11. The process of claim 7, wherein the operation of imparting to the active element a two-way movement in the path of advance of the article and the operation of imparting to the active clement a movement towards and away from the path of advance of the articles are independently controlled by a control unit acting on a first and second motor means in order to exert independent control over the operations.

* * * * *